United States Patent [19]

Hagen et al.

[11] Patent Number: 4,487,728

[45] Date of Patent: Dec. 11, 1984

[54] MANUFACTURE OF A MOLDING FROM A THERMOPLASTIC POWDER OR GRANULAR MATERIAL

[75] Inventors: Karl Hagen, Friedelsheim; Karl H. Scholl, Lambsheim, both of Fed. Rep. of Germany

[73] Assignee: BASF Aktiengesellschaft, Fed. Rep. of Germany

[21] Appl. No.: 509,057

[22] Filed: Jun. 29, 1983

Related U.S. Application Data

[63] Continuation of Ser. No. 221,550, Dec. 31, 1981, abandoned.

[30] Foreign Application Priority Data

Jan. 28, 1980 [DE] Fed. Rep. of Germany ....... 3002910

[51] Int. Cl.$^3$ ............................................. B29F 5/00
[52] U.S. Cl. ...................................... 264/23; 264/71; 425/174.2
[58] Field of Search ............................ 264/23, 69, 71; 425/174.2

[56] References Cited

U.S. PATENT DOCUMENTS

| | | | |
|---|---|---|---|
| 3,471,601 | 10/1969 | Goetgheluck | 264/512 |
| 3,717,427 | 2/1973 | Bodine | 264/23 X |
| 4,014,965 | 3/1977 | Stube et al. | 264/23 |

FOREIGN PATENT DOCUMENTS

| | | | |
|---|---|---|---|
| 1805090 | 5/1970 | Fed. Rep. of Germany | 264/23 |
| 2558827 | 7/1977 | Fed. Rep. of Germany | 264/71 |

OTHER PUBLICATIONS

Saechling-Zebrowski, "Kunststoff-Taschenbuch", 19th Edition, 1974, p. 55-57 and pp. 174-182.

Primary Examiner—Jan Silbaugh
Attorney, Agent, or Firm—Keil & Weinkauf

[57] ABSTRACT

Moldings, for example hollow articles, are produced by sintering a thermoplastic powder or granular material and then reshaping the resulting blank by thermoforming. Sintering is carried out in a mold cavity under pressure, by exposure to high-frequency vibrations, which heats the plastic to a temperature intermediate between its softening point and its melting point. In this way, grain boundary adhesion between the individual plastic particles constituting the blank results, and the directly subsequent thermoforming can be carried out without additional supply of heat.

7 Claims, 1 Drawing Figure

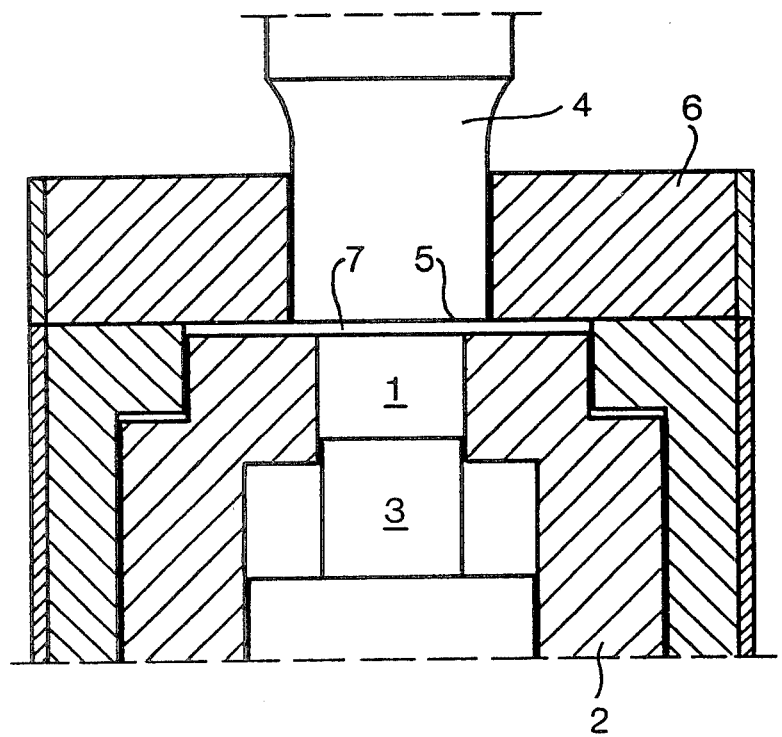

MANUFACTURE OF A MOLDING FROM A THERMOPLASTIC POWDER OR GRANULAR MATERIAL

This is a continuation of application Ser. No. 221,550, filed Dec. 31, 1980, and now abandoned.

The present invention relates to a process for the manufacture of a molding from a thermoplastic powder or granular material by sintering, and subsequent thermoforming of the article produced.

The conventional methods of manufacturing moldings from thermoplastics comprise plasticizing the material concerned and then shaping it, under pressure and heat, using a torpedo, plunger or screw apparatus. In every case, the polymer is caused to flow and is, for this purpose, heated to a temperature which is, to a varying degree, above its crystallite melting point or softening point. After the molding has been formed, it must be cooled to room temperature. This sequence requires equipment which comprises functional sub-units for plasticizing, molding and cooling. Because of the low thermal efficiency of such units, the energy consumption for converting a polymer raw material to a molding is several times greater than that calculated from the properties of the material. As a result, increases in output of processing machinery require disproportionately larger electrical power units.

It has hitherto not proved possible to activate the mechanical potentials which are theoretically inherent in the plastic. These potentials, which are dependent on the structure of the crystallites and on the orientation of the molecular chains can only be utilized to a slight degree in the conventional processes. Admittedly it is known that a further proportion of these mechanical potentials may be activated by downstream treatments, e.g. stretching, cold flow pressing, cold milling or impact molding; however, this does not offer a satisfactory solution in respect of energy expenditure, waste reduction and activation of mechanical potential, since, in every case, a blank, or sheet rod or tube, produced by conventional thermoplastic processing methods serves as the starting point.

It is an object of the present invention to provide a particularly energy-saving process for the manufacture of moldings from thermoplastics, which is free from the above disadvantages and which, in particular, makes it possible to utilize the high mechanical potentials of the plastic, in the sense that the physical properties of the molding are improved.

We have found that this object is achieved, in principle, by a process wherein the plastic is heated in a mold cavity under pressure, by means of high-frequency vibrations, to a temperature intermediate between the softening point and the melting point, and is shaped, by the force of a press, to give a blank, which directly thereafter is reshaped to give a molding.

All thermoplastics are suitable for the novel process; examples include olefin polymers, e.g. polyethylene and polypropylene, styrene polymers, e.g. polystyrene and styrene copolymers, chlorine-containing polymers, e.g. polyvinyl chloride and chlorinated polyolefins, nylons, poly(methyl methacrylate), polyacetals, polycarbonates and mixtures of these polymers.

These plastics may contain conventional additives, e.g. fillers, pigments, colorants, antistatic agents, stabilizers, flameproofing agents or lubricants.

The plastics, in the form of a powder or of granules, are exposed, in a closed, preferably multipart mold, to a pressure of about 10–200 bar, oscillating at about 15–21 kHz, advantageously 19–20 kHz. The pressure is chosen so that below the crystallite melting point grain boundary adhesion results, which suffices to bond the individual particles to form a coherent shape. By increasing the frequency of the oscillator, or alternatively by varying the pressure, the shape thus produced can be heated to the softening point and be reshaped in the solid state, in a subsequent process step, for example by thermoforming, to give a molding. Molding of the blank or parison is effected immediately without additional heat supply. Accordingly, in such a process the only energy which need be expended is that required for the actual molding. Energy for heating the plastic to a temperature above its softening point, such as is essential when processing the material by plasticization, is not needed. This results in energy savings of 40% or more. The improvement in the physical properties of the moldings is a further advantage. For example, we have found that a polypropylene molding showed an increase in bursting pressure from 6 bar to 20 bar, whilst the stress cracking resistance was at the same time improved by a factor of 2.8.

Using the process according to the invention, it is also possible to impart, to the pressed blank, appropriate contours which depend on the conditions of the subsequent reshaping and are of importance in respect of the molding to be produced, for example sealing flanges or beading or molded-on portions to serve as filling orifices and the like. It is also possible to produce blanks which are composed of two or more layers, for example layers of similar materials but of different color, or layers of different materials, such as polyethylene and nylon. From these, moldings are produced which have specific decorative properties or specific use characteristics appropriate to their ultimate application. In such multi-layer products, the plastics employed are sintered successively, i.e. the individual streams of plastic successively take their place under the blank first produced, and thereby create the desired layer structure.

Further embodiments of the invention are to be found in the sub-claims.

The invention is explained in more detail below in relation to the accompanying drawing.

The thermoplastic, in powder or granule form, is introduced into the cavity 1 of a movable platen 2. The amount of plastic introduced corresponds to the volume of the blank to be produced; the upper plunger 4 is then caused to undergo high-frequency vibrations, in particular at a frequency of about 15–21 kHz, with an amplitude of about 20–60 μm. At the working face 5 of the plunger, the mechanical energy expended is transmitted to the plastic and converted to heat. Axial movement of the pressure piston 3 then has the effect that the plastic which has been softened at the face 5 of the plunger 4 passes into the pressure chamber 7, so that fresh plastic can continuously be fed, from the cavity 1, onto the working face 5 of the plunger 4, until the entire volume of plastic (initially) present in the cavity 1 has been conveyed into the pressure chamber 7. The viscosity of the plastic which flows from the working face 5 of the plunger 4 into the pressure chamber 7 can be controlled by the speed of the pressure piston 3, since this may be used to vary the residence time of the plastic under the working face 5 of the plunger 4. When the pressure chamber 7 has been filled, a blank is produced by a working stroke of the platen 2, which, together with the pressure piston 3 then in its uppermost working position, forms a continuous press face.

It is particularly advantageous to control the temperature of the upper platen 6 and the lower platen 2 of the press, so that the temperature of the balnk can be suited to the conditions of the subsequent reshaping to form the final molding. Temperature control of these platens can also be of importance with a view of improving the use characteristics of the moldings, since the biaxial orientation, taking place in the subsequent molding processes, only takes place under optimum conditions if the molding temperature is appropriate. For example, we have found that biaxial stretching of a polypropylene blank gives transparent moldings only if the reshaping temperature is from 139 to 142° C. Other temperatures than this give moldings with varying degrees of opacity.

The blank produced in this manner is then passed to a molding station and is reshaped directly, at the same temperature, by conventional methods, such as thermoforming, stamping, extrusion, vacuum forming, stretch-blowing or blow-molding, to give a molded article. In particular, hollow articles, e.g. cups, tubes, boxes and the like can be produced from the blank, as by reshaping with the aid of a pressure piston.

We claim:

1. A process for the manufacture of molding blanks from powdered or granular thermoplastic materials which comprises:
   (a) introducing powdered or granular thermoplastic material into a cavity of a blank-forming device, said device including a pressure chamber wherein the blanks are shaped, movable platens operatively associated with said chamber, a vibrating plunger having a face adjacent said chamber, and a piston for moving said thermoplastic material into the pressure chamber from said cavity;
   (b) heating the powdered or granular thermoplastic material as it enters the pressure chamber of the blank-forming device by causing said plunger to undergo high frequency vibration in contact with the freshly introduced thermoplastic material;
   (c) maintaining a predetermined pressure on the thermoplastic material as it is heated;
   (d) continuously forcing softened thermoplastic material past the vibrating plunger and into the pressure chamber and replacing the material with unsoftened thermoplastic material; and thereafter
   (e) pressing the softened thermoplastic material into a blank by means of the movable platens after the pressure chamber has been filled with the desired amount of thermoplastic material,
   whereby, a blank is formed which can be molded to a final shape without the addition of further heat.

2. A process as set forth in claim 1, wherein the plastic is heated by application of a pressure of 10–200 bar and high-frequency vibrations of 15–21 kHz.

3. A process as set forth in claim 1, wherein the blank is biaxially oriented while being reshaped.

4. A process as set forth in claim 1, wherein the blank is formed from two or more layers of different thermoplastics.

5. A process as set forth in claim 1, wherein the blank is reshaped to form a hollow article.

6. A process as set forth in claim 5, wherein the blank is reshaped, to form a hollow article, by vacuum forming.

7. A process as set forth in claim 5, wherein the blank is reshaped, to form a hollow article, with the aid of a pressure piston.

* * * * *